(12) United States Patent
Colavito et al.

(10) Patent No.: US 8,257,485 B2
(45) Date of Patent: Sep. 4, 2012

(54) CALCIUM ENRICHED REFRACTORY MATERIAL BY THE ADDITION OF CALCIUM CARBONATE

(75) Inventors: Dominick M. Colavito, Bangor, PA (US); Yves C. Vermeulen, Pen Argyl, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 1052 days.

(21) Appl. No.: 12/193,068

(22) Filed: Aug. 18, 2008

(65) Prior Publication Data

US 2009/0047425 A1 Feb. 19, 2009

Related U.S. Application Data

(60) Provisional application No. 60/965,191, filed on Aug. 17, 2007.

(51) Int. Cl.
*C04B 9/00* (2006.01)
(52) U.S. Cl. ........ 106/685; 106/686; 106/801; 106/802; 106/810; 501/108; 501/109; 501/113
(58) Field of Classification Search .................. 106/685, 106/686, 801, 802, 810; 501/108, 109, 113
See application file for complete search history.

(56) References Cited

U.S. PATENT DOCUMENTS

| 3,141,785 A | 7/1964 | Davies |
| 3,897,256 A | 7/1975 | Murton |
| 4,463,100 A | 7/1984 | Cassens, Jr. |
| 4,923,831 A | 5/1990 | Uzaki et al. |
| 5,124,288 A | 6/1992 | Ishikawa et al. |
| 7,078,360 B2 | 7/2006 | Gist et al. |

FOREIGN PATENT DOCUMENTS

| EP | 0 260 322 A1 | 3/1988 |
| GB | 1 225 966 A | 3/1971 |
| GB | 1 373 941 A | 11/1974 |
| WO | 91/12217 A1 | 8/1991 |

OTHER PUBLICATIONS

International Preliminary Examination Report for PCT/US2008/009783, issued Feb. 24, 2010, 6 pages.*
Supplementary European Search Report dated Jun. 8, 2011 for counterpart EP application No. 08795367.5.
International Search Report dated Nov. 3, 2008 for PCT Application No. PCT/US08/09783.

* cited by examiner

*Primary Examiner* — Paul Marcantoni
(74) *Attorney, Agent, or Firm* — Derek S. Jessen; Leon Nigohosian, Jr.

(57) ABSTRACT

The composition applied to the refractory structure has a magnesia-based refractory material, calcium carbonate and a binder. After application of the refractory material to a refractory structure and upon application of heat to the applied refractory material a matrix is formed which protects against penetration of the slag into the refractory material. The resulting refractory material has improved hot strength, slag resistance and durability.

14 Claims, No Drawings

CALCIUM ENRICHED REFRACTORY MATERIAL BY THE ADDITION OF CALCIUM CARBONATE

BACKGROUND OF THE INVENTION

The present invention relates to refractory material for applying to a refractory structure and a method of applying the refractory material to a refractory structure or lining. More particularly, the invention is directed to preserving or maintaining refractory structures or linings from mechanical erosion and/or attack by corrosive materials such as those produced during manufacture of metals or metal alloys including acid and basic slags. The refractory linings also are exposed to thermal shock which can cause premature failure of the refractory.

SUMMARY

The present invention is directed to a composition of a refractory material and a method of coating a refractory structure, particularly a hot refractory structure using the refractory material. The refractory material can be applied to a refractory structure such as a vessel or ladle. The composition of the refractory material which applied to the refractory structure comprises from about 20 to about 95 weight percent magnesia-based refractory material, from about 2.0 to about 10 weight percent calcium carbonate and from about 0.1 to about 5 weight percent of a binder such as organic acid, alkali silicate or alkali phosphate.

Heat from the furnace or vessel which contacts the refractory material on the refractory structure accelerates the hardening and curing of the refractory material of the present invention by transmission of heat to the refractory material so as to form a high density matrix of refractory material. The applied refractory material passes from the plastic state to a nonplastic or substantially rigid and nonpliable state in its final form in which the above mentioned high density matrix is present. The calcium carbonate in the refractory material is calcined in place upon transfer of the heat from the furnace or vessel which is being processed in the refractory structure to which the refractory material is applied. Carbon dioxide gas evolves therefore after the refractory material is no longer in the plastic state. The refractory material forms a high density matrix which protects against penetration of slag and molten metal.

In the present invention the calcium carbonate calcines in place which leaves a very reactive source of calcia within the matrix of the refractory mass. In the present invention the coarsest calcium carbonate can be ATF-20 which has a particle size distribution that starts below 0.85 mm. The very fine calcium carbonate of the present invention can be Vicron® 15-15 limestone product which has a particle size distribution that starts below 15 microns (0.015 mm). In the present invention fine calcium carbonate is added to be reactive with the magnesia grains and any infiltrating slag, not as a coarse particle size distribution for thermal shock resistance.

In another embodiment the magnesia-based refractory material of the composition of the refractory material is present in an amount from about 20 to about 95 weight percent.

In another embodiment the magnesia-based refractory material of the composition of the refractory material is present in an amount from about 60 to about 88 weight percent.

In another embodiment the calcium carbonate of the composition of the refractory material is present in at least two different particle size distributions. A fine form of calcium carbonate is present in an amount of from about 3.5 to about 4.5 weight percent and a coarser form calcium carbonate is present in an amount of from about 3.5 to about 4.5 weight percent.

In another embodiment the calcium carbonate of the composition of the refractory material is present in at least two different particle size distributions. A fine form of calcium carbonate is present in an amount of from about 2.5 to about 3.5 weight percent and a coarser form of calcium carbonate is present in an amount of from about 2.5 to about 3.5 weight percent.

In another embodiment the composition of the refractory material further comprises from about 0.2 to about 8 weight percent calcium hydroxide.

In another embodiment the composition of the refractory material further comprises from about 0.1 to about 2.0 weight percent of a plasticizer such as bentonite.

In another embodiment the composition of the refractory material further comprises from about 0.1 to about 1.0 weight percent of a dispersant such as citric acid.

The refractory material can be applied by a gunning system.

After the high density matrix of the refractory material has been formed, a layer of the refractory material protects the refractory structure to which the refractory material has been applied against attack by corrosive materials such as molten slags and molten metals, especially against attack by acid and basic slags, and steel.

In the method of the invention, application of the refractory material can be applied to provide a layer of refractory material of a thickness of about 1 inch to about 12 inches both prior to exposing as well as after exposing the lining to corrosive materials. Desirably, application of the refractory material is performed prior to initial exposure of the refractory lining to the corrosive materials, and can be repeated after each exposure of the lining to those corrosive materials. Depending on the degree of erosion, corrosion or penetration of corrosive materials into the applied refractory material, the refractory material of the present invention need not be reapplied to the refractory material after every contact of corrosive materials with the refractory material.

Application of the refractory material can be performed while the refractory material is at a temperature of about 32 degrees F. to about 2500 degrees F.

DETAILED DESCRIPTION OF THE INVENTION

The invention will now be described in detail by reference to the following specification and non-limiting examples. Unless otherwise specified, all percentages are by weight and all temperatures are in degrees Fahrenheit.

The composition applied to the refractory structure comprises from about 20 to about 95 weight percent of a magnesia based refractory material such as magnesia, from about 2.0 to about 10 weight percent calcium carbonate, and from about 0.1 to about 5.0 weight percent of a binder such as organic acid, alkali silicate or alkali phosphate.

Heat from the furnace which contacts the refractory material on the refractory structure accelerates the hardening and curing of the refractory material of the present invention by transmission of heat from the underlying refractory structure to the refractory material so as to form a high density matrix of refractory material. The applied refractory material passes from the plastic state to a nonplastic or substantially rigid and nonpliable state in its final form in which the above mentioned high density matrix is present. The calcium carbonate in the refractory material is calcined in place upon transfer of the heat from the refractory structure itself. Carbon dioxide gas evolves therefore not while the refractory material is in a plastic state. The refractory material forms a high density matrix which protects against penetration of slag and molten metal. The calcium from the calcium carbonate forms CaO or calcia which enriches the matrix phase of the refractory material which is where initial slag penetration would occur.

The use of calcium carbonate as a source of CaO (calcia) is desirable because it does not significantly react with water (hydrate or decompose) or other refractory constituents during the mixing with water or subsequent refractory material application. If calcium oxide were to be used instead of the calcium carbonate, the calcium oxide would rapidly react with water and/or other bond components so as to disrupt the integrity of the applied mass which would result in poor durability of the applied refractory. The calcium carbonate in the present invention calcines upon exposure to heat to form reactive calcium oxide. When slag comes in contact with this calcium oxide the calcium oxide readily reacts with the slag to produce high melting point compounds such as dicalcium silicate. These compounds thicken and or solidify the slag so as to prevent further penetration of the slag into the body of the refractory. This mechanism reduces corrosion of the refractory thereby extending the service life of the refractory.

The refractory material can be applied through any batch or continuous feed gunning system. The refractory material has good slag and erosion resistance. The material is suitable for use for the maintenance of electric arc furnaces, basic oxygen furnaces, and other metallurgical vessels or ladles. The refractory material can be applied manually using hand tools.

The wetting agent for a gunning composition of the magnesia based refractory material can be any suitable dispersant, superplasticizer, anionic, cationic or nonionic surfactant, the selection of which for any particular composition would be understood by one of ordinary skill in the art of refractories.

Heat which is applied to the refractory composition of the present invention contributes to the forming of a high density matrix of refractory material. A magnesia based refractory composition results, having improved physical properties, at temperatures from about 230 degrees F. to about 3200 degrees F. over compositions currently used for production or repair of refractory furnace linings.

Without further elaboration, it is believed that one skilled in the art can, using the preceding description, utilize the present invention to its fullest extent. The following embodiments are, therefore, to be construed as merely illustrative, and not limitative of the remainder of the disclosure in any way whatsoever.

Magnesia, i.e., MgO, for the refractory material of the present invention can be derived from sources such as natural, seawater or brine magnesite, or mixtures thereof. The magnesia preferably is dead burned magnesia. By "dead burned" magnesia is meant magnesia fired to high temperatures to produce refractory grains with reduced reactivity with water and impart a degree of hydration resistance to the refractory grains which are formed substantially completely of well-sintered, low porosity crystals to distinguish them from reactive lower temperature calcined caustic magnesite. Such materials are commercially available in purities of from about 60 to about 99 weight percent magnesia.

Plasticizers useful in the refractory compositions include but are not limited to clays such as ball clay, kaolinite, or bentonite, aluminum hydroxide, and starch preferably bentonite.

High temperature binders useful in the refractory compositions include but are not limited to alkali phosphates such as sodium phosphate, potassium phosphate, ammonium phosphate, magnesium phosphate, calcium phosphate, and alkali silicates such as sodium silicate, potassium silicate, magnesium silicate, calcium silicate, and sulfates such as sodium sulfate, potassium sulfate, magnesium sulfate, calcium sulfate, ammonium sulfate, zirconium sulfate, aluminum sulfate and sulfamic acid. Preferred binders include sodium silicate, sodium phosphate and sulfamic acid. These plasticizers and high temperature binders are commercially available.

In the present invention the amount of calcium carbonate present can be from about 2.0 to about 10 weight percent of the total refractory blend. Use of weight percentages of calcium carbonate of more than about 10 weight percent is limited by the inability of the calcium carbonate to integrate itself into a resultant refractory matrix which is formed after heat is applied to the refractory blend. Use of weight percentages of calcium carbonate of less than about 2.0 weight percent of calcium carbonate is limited by the inability of the calcium carbonate to be a part of a high density matrix in the refractory material which inhibits penetration of slag into the matrix.

The calcium carbonate of the present invention can be of two different particle size distributions such as a very fine portion and a coarser portion. A coarser portion of calcium carbonate can be a calcium carbonate such as ATF-20 screened limestone product available from Specialty Minerals Inc. of Bethlehem, Pa. ATF-20 screened limestone product has only a trace amount of particles larger than 20 mesh (0.85 mm), about 15 weight percent larger than 40 mesh and about 75 weight percent larger than 100 mesh and about 92 weight percent larger than 200 mesh. A very fine portion of calcium carbonate can be a calcium carbonate such as Vicron® 15-15 ground limestone product available from Specialty Minerals Inc. of Bethlehem, Pa. Vicron 15-15 ground limestone has only about 0.004 weight percent of particles larger than 325 mesh and an average particle size of 3.5 microns.

In another embodiment the calcium carbonate of the composition of the refractory material is present as a single particle size distribution. A very fine form of calcium carbonate is present in the refractory material in an amount of from about 2.0 to about 7.0 weight percent.

In another embodiment the calcium carbonate of the composition of the refractory material is present in at least two different particle size distributions. A very fine form of calcium carbonate is present in an amount of from about 3.5 to about 4.5 weight percent and a coarser form of calcium carbonate is present in an amount of from about 3.5 to about 4.5 weight percent.

In another embodiment the calcium carbonate of the composition of the refractory material is present in at least two different particle size distributions. A very fine form of calcium carbonate is present in an amount of from about 2.5 to about 3.5 weight percent and a coarser form of calcium carbonate is present in an amount of from about 2.5 to about 3.5 weight percent.

In one embodiment, the refractory material has about 3.5 to about 4.5 weight percent of a very fine portion of calcium carbonate and about 3.5 to about 4.5 weight percent of a coarser portion of calcium carbonate. In addition, the refractory blend can have from about 0.2 to about 5 weight percent of sodium hexametaphosphate as a setting agent and high temperature binder to provide strength and substrate adherence. Examples of a refractory material of this embodiment is set forth in Examples 1, 2 and 3.

In one embodiment, the refractory material has about 2.5 to about 3.5 weight percent of a very fine portion of calcium carbonate and about 2.5 to about 3.5 weight percent of a coarser portion of calcium carbonate. In addition, the refractory blend can have from about 0.2 to about 3.0 weight percent of sulfamic acid as a setting agent and high temperature binder to provide strength and substrate adherence. An example of a refractory material of this embodiment is set forth in Example 4.

The compositions were tested in an induction furnace. The compositions met or exceeded the performance requirements in the areas of density, strength, drying, resistance to cracking, and durability.

Unless otherwise identified, all mesh sizes are in U.S. Mesh. As set forth below, mesh sizes are shown in a format such as 5×8 which means particles smaller than 5 mesh and larger than 8 mesh are present.

Example 1

Table 1 shows a refractory material for applying onto a hot or cold refractory structure such as the slag line of a vessel or ladle. The following formulation of refractory material was dry mixed for 3 minutes after all ingredients were in the mixer.

TABLE 1

| Material | Description | Wt. Percent |
|---|---|---|
| 97 grade Magnesia | 5 × 8 Mesh | 20.00 |
| 97 grade Magnesia | 8 × 18 Mesh | 28.00 |
| 97 grade Magnesia | −18 Mesh | 28.70 |
| 97 grade Magnesia | Powder | 12.00 |
| Bentonite | Powder | 0.80 |
| Very Fine Calcium Carbonate | Vicron ® 15-15 ground limestone | 4.00 |
| Coarser Calcium Carbonate | ATF-20 | 4.00 |
| Sodium Silicate | Powder | 1.00 |
| Citric Acid | Powder | 0.50 |
| Sodium hexametaphosphate | Powder | 1.00 |

Example 2

Table 2 shows a refractory material for applying onto a hot or cold refractory structure such as the slag line of a vessel or ladle. The following formulation of refractory material was dry mixed for 3 minutes after all ingredients were in the mixer.

TABLE 2

| Material | Description | Wt. Percent |
|---|---|---|
| 90 grade Magnesia | 5 × 8 Mesh | 20.00 |
| 90 grade Magnesia | 8 × 18 Mesh | 28.00 |
| 90 grade Magnesia | −18 Mesh | 28.70 |
| 90 grade Magnesia | Powder | 12.50 |
| Bentonite | Powder | 0.80 |
| Very Fine Calcium Carbonate | Vicron ® 15-15 ground limestone | 4.00 |
| Coarser Calcium Carbonate | ATF-20 limestone | 4.00 |
| Sodium Silicate | Powder | 1.00 |
| Citric Acid | Powder | 0.50 |
| Sodium hexametaphosphate | Powder | 0.50 |

The sodium silicate of the above Example 2 is hydrated sodium silicate Pyramid P60 having a $SiO_2$ to $Na_2O$ ratio of 3.3.

Example 3

Table 3 shows a refractory material for applying onto a hot or cold refractory structure such as the slag line of a vessel or ladle. The following formulation of refractory material was dry mixed for 3 minutes after all ingredients were in the mixer.

TABLE 3

| Material | Description | Wt. Percent |
|---|---|---|
| 90 grade Magnesia | 5 × 8 Mesh | 20.00 |
| 90 grade Magnesia | 8 × 18 Mesh | 28.00 |
| 90 grade Magnesia | −18 Mesh | 28.70 |
| 97 grade Magnesia | Powder | 12.00 |
| Bentonite | Powder | 0.80 |
| Very Fine Calcium Carbonate | Vicron ® 15-15 ground limestone | 4.00 |
| Coarser Calcium Carbonate | ATF-20 limestone | 4.00 |
| Sodium Silicate | Powder | 1.00 |
| Citric Acid | Powder | 0.50 |
| Sodium hexametaphosphate | Powder | 1.00 |

Example 4

Table 4 shows a refractory material for applying onto a hot or cold refractory structure such as the slag line of a vessel or ladle. The following formulation of refractory material was dry mixed for 3 minutes after all ingredients were in the mixer.

TABLE 4

| Material | Description | Wt. Percent |
|---|---|---|
| 97 grade Magnesia | 5 × 8 Mesh | 23.80 |
| 97 grade Magnesia | 8 × 18 Mesh | 35.60 |
| 97 grade Magnesia | −18 Mesh | 12.50 |
| 97 grade Magnesia | Powder | 16.30 |
| Bentonite | Powder | 0.80 |
| Very Fine Calcium Carbonate | Vicron ® 15-15 ground limestone | 3.00 |
| Coarser Calcium Carbonate | ATF-20 | 3.00 |
| Calcium Hydroxide | Powder | 2.50 |
| Citric Acid | Powder | 0.50 |
| Sulfamic acid | Powder | 2.00 |

Accordingly, it is understood that the above description of the present invention is susceptible to considerable modifications, changes and adaptations by those skilled in the art, and that such modifications, changes and adaptations are intended to be considered within the scope of the present invention.

We claim:

1. A composition suitable for providing a refractory material comprising:
   20 to 95 weight percent magnesia containing refractory material;
   0.1 to 5.0 weight percent of a binder; and
   2.0 to 10 weight percent of calcium carbonate for reacting upon exposure to heat to provide the refractory material as a source of calcium oxide for increasing corrosion resistance.

2. The composition according to claim 1 wherein the binder is an organic acid.

3. The composition according to claim 1 wherein the magnesia containing refractory material is present in an amount of 60 to 88 weight percent.

4. The composition according to claim 1 further comprising calcium hydroxide in amount of 0.2 to 8.0 weight percent.

5. The composition according to claim 1 further comprising a plasticizer in an amount of 0.1 to 2.0 weight percent.

6. The composition according to claim 5 wherein the plasticizer is bentonite.

7. The composition according to claim 1 further comprising a dispersant in an amount of from 0.1 to 1.0 weight percent.

8. The composition according to claim 7 wherein the dispersant is citric acid.

9. The composition according to claim 1 wherein the binder is sulfamic acid wherein the sulfamic acid is present in an amount of 0.2 to 3.0 weight percent.

10. The composition according to claim 1 wherein the calcium carbonate is present in an amount of 2.0 to 7.0 weight percent wherein the calcium carbonate has a particle size of less than 325 mesh.

11. The composition according to claim 1 wherein the calcium carbonate is present in a very fine portion having a particle size of less than 325 mesh and a coarser portion wherein the coarser portion has a particle size less than 20 mesh, 15 weight percent larger than 40 mesh, 75 weight percent larger than 100 mesh and 92 weight percent larger than 200 mesh.

12. The composition according to claim 11 wherein the very fine portion is present in an amount of 2.5 to 3.5 weight percent and the coarser portion is present in an amount of 2.5 to 3.5 weight percent.

13. The composition according to claim 11 wherein the very fine portion is present in an amount of 3.5 to 4.5 weight percent and the coarser portion is present in an amount of 3.5 to 4.5 weight percent.

14. The composition according to claim 12 further comprising 0.2 to 3.0 weight percent sulfamic acid.

* * * * *